United States Patent [19]
Smith et al.

[11] Patent Number: 5,628,483
[45] Date of Patent: May 13, 1997

[54] WRIST REST

[75] Inventors: Mark R. Smith, Palo Alto; Philip G. Wessells, Menlo Park, both of Calif.

[73] Assignee: ACCO USA, Inc., Wheeling, Ill.

[21] Appl. No.: 710,045

[22] Filed: Sep. 10, 1996

Related U.S. Application Data

[63] Continuation of Ser. No. 255,581, Jun. 8, 1994, abandoned, which is a continuation-in-part of Ser. No. 6,225, Jan. 19, 1993, Pat. No. 5,358,203, which is a continuation of Ser. No. 690,742, Apr. 24, 1991, Pat. No. 5,197,699.

[51] Int. Cl.⁶ .................................................. B68G 5/00
[52] U.S. Cl. ........................ 248/118; 248/918; 400/715
[58] Field of Search ........................... 248/118, 118.1, 248/118.3, 118.5, 918; 400/715

[56] References Cited

U.S. PATENT DOCUMENTS

| | | | |
|---|---|---|---|
| 4,481,556 | 11/1984 | Berke et al. | 361/222 |
| 4,482,063 | 11/1984 | Berke et al. | 211/69.1 |
| 4,545,554 | 10/1985 | Latino et al. | 248/118.1 X |
| 4,621,781 | 11/1986 | Springer | 248/118 |
| 4,709,972 | 12/1987 | LaBudde et al. | 312/208 |
| 4,973,176 | 11/1990 | Dietrich | 248/118 X |
| 5,022,622 | 6/1991 | Schaevitz | 248/118 X |
| 5,056,743 | 10/1991 | Zwar et al. | 248/118 |
| 5,125,606 | 6/1992 | Cassano et al. | 248/118 |
| 5,131,614 | 7/1992 | Garcia et al. | 248/118 |
| 5,163,646 | 11/1992 | Engelhardt | 248/118 |
| 5,165,630 | 11/1992 | Connor | 248/118.1 |
| 5,170,971 | 12/1992 | Schaeffer et al. | 248/118.1 |
| 5,197,699 | 3/1993 | Smith et al. | 248/118 |
| 5,228,655 | 7/1993 | Garcia et al. | 248/118 |
| 5,320,317 | 6/1994 | Hyatt | 248/118.1 |
| 5,358,203 | 10/1994 | Smith et al. | 248/118 |
| 5,451,020 | 9/1995 | Smith et al. | 248/118 |

FOREIGN PATENT DOCUMENTS 2148853  3/1973  France .

OTHER PUBLICATIONS

Brochure for "Keyboard Wrist Rest," Alimed, Inc., 1990, Product #1011.
Brochure for "Key Pads," American Covers Inc.
Brochure for "Keyboard Buddy," Computer Expressions.
Brochure for "Wrist Supports," M&M Industries.
Brochure for "Wrist Pro," Wrist Pro.
Brochure for "Wristonics," Marcus Franklin & Associates.
Brochure for "Wrist-Stop," George McDonald Engineering Co., Inc., 1990.
Brochure for "Wrist Pad Plus," Marty's Computer Workshop.
Brochure for "Keyboard Wrist Rest," Global Computer Supplies.
Brochure for "Curtis Wrist Rest," Curtis Manufacturing, Inc.

*Primary Examiner*—Ramon O. Ramirez
*Attorney, Agent, or Firm*—Townsend and Townsend and Crew LLP

[57] ABSTRACT

A wrist rest (1) of specially designed height and other characteristics is provided for reducing strain on the wrists and hands of a keyboard operator or a similar user of computer accessories. The rest (1) is made to be placed in front of the keyboard or accessory being used, and may be designed to have a particular firmness for comfort. In some embodiments the rest has two foam rubber layers (20,30) about ¾ inch thick total; the bottom surface has no "skin", to prevent the rest from slipping, while the upper surface has a smooth covering (10) so hands may slide around easily and comfortably. In order to allow rests designed for a normal keyboard to be adapted for use with an especially long keyboard, or with an accessory like a mousepad (4), one embodiment (3) of the invention has contours (101) which can interlock with similar contours (100) on an extension pad (2); these contours are also designed to be easily and inexpensively manufactured.

20 Claims, 7 Drawing Sheets

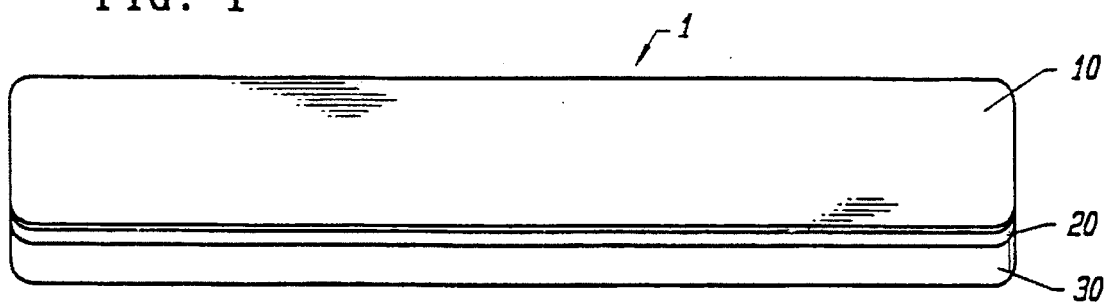
FIG. 1
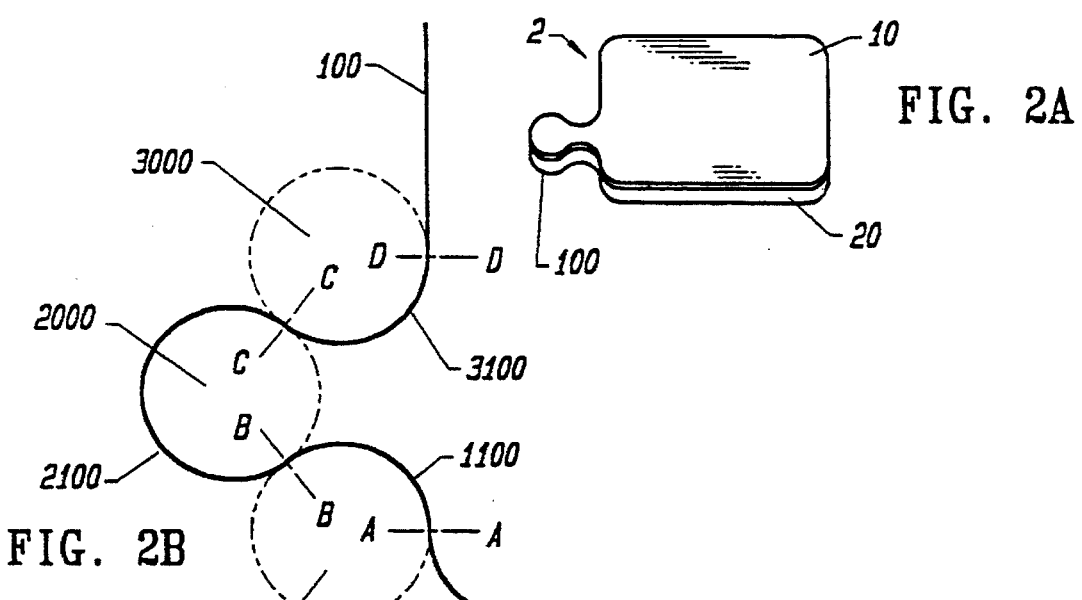
FIG. 2A
FIG. 2B
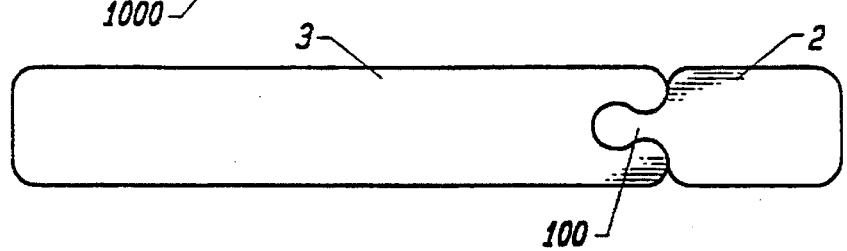
FIG. 3
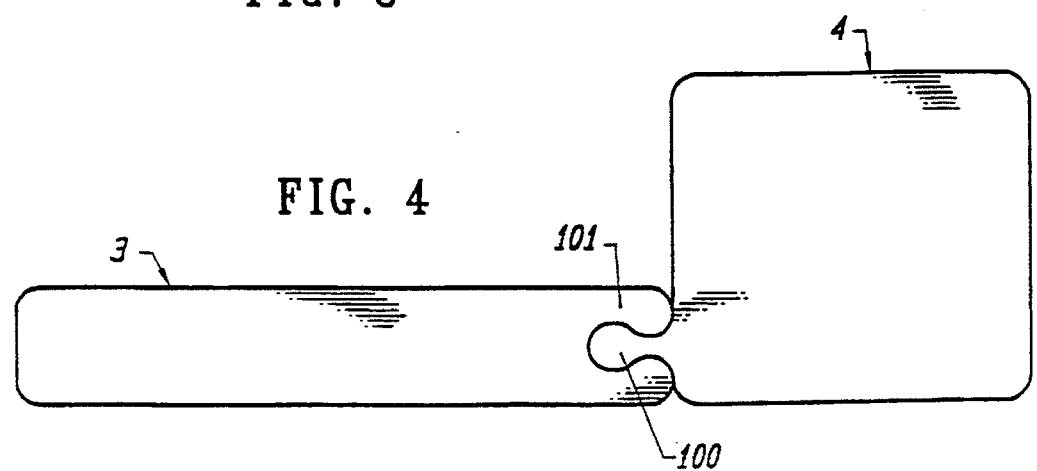
FIG. 4

WRIST REST

CROSS REFERENCE TO RELATED APPLICATIONS

This application is a continuation of Ser. No. 255,581, Jun. 8 1994, now abandoned, which is a continuation in part application of U.S. patent application Ser. No. 08/006,225, filed Jan. 19, 1993, U.S. Pat. No. 5,358,203 which is a continuation application of U.S. patent application Ser. No. 07/690,742, filed Apr. 24, 1991 and which issued as U.S. Pat. No. 5,197,699.

BACKGROUND OF THE INVENTION

This invention relates generally to pads for computer users to rest their hands on while using accessories such as keyboards, trackballs, and "mice". This invention relates specifically to pads for computer keyboard operators to rest their hands on to reduce stress on the hands, wrists, and arms, most specifically to reduce the risk of developing of carpal tunnel syndrome.

Disorders in the upper extremities are frequently seen in people whose jobs require high speed repeated motions. About half of the forty million office workers in the United States alone presently work with video display terminals (VDTs) on the job. As VDT use, both in the numbers of people and the amount of time spent at the VDT, continues to rise in the office place, the number of cases of repetitive stress injury increases apace. Repetitive stress injury is one of the leading occupational health problems of the past decade and shows signs of continued growth in the coming decade.

Repetitive stress injuries resulting from keyboard use can take a number of forms. Steady contraction of the muscles of the upper arms and shoulder-chest region, used to hold the hands and arms outstretched over a keyboard, can lead to muscle fatigue. Muscle fatigue is seldom serious, though, and can be corrected by occasional breaks to rest the arms, and by keeping distances to work materials such as a keyboard to a minimum. Tendons seem susceptible to repetitive stress injury even more so than muscles. Most forms of tendon irritation are either the result of overuse and improper sliding between tendons and other tendons or structures nearby. The resulting inflammation and possible fraying of the tendon can result in the need for extended rest and a change in work habits. Tendonitis, Tenosynovitis, and Epicondylitis are all painful swellings of tendon junctions with muscles, at their point of insertion to the bone, and with their sheaths, respectively. A ganglion is usually a smooth round swelling or inflammation which appears near a joint, such as the wrist, or a tendon sheath; ganglions most often occur on the back of the hand.

More serious tendon injuries include ulnar nerve irritation and carpal tunnel syndrome. Tension on certain flexor muscles in the elbow and wrist can cause compression of the ulnar nerve at the elbow or wrist and result in reduced sensation on the ring and little fingers, as well as loss of dexterity in the hand. Occasionally, such nerve entrapment from repetitive overuse requires surgical release of the nerve. The main nerve of the hand, the median nerve, passes through a narrow tunnel through the wrist formed on the top by the wrist bones and on the bottom by a ligament. The channel, called the "carpal tunnel", also houses the tendons from the forearm muscles responsible for curling or closing the hand and fingers. Blood vessels in the hand also pass through the carpal tunnel. When the hands are bent back or forward sharply there is a three-fold increase in the pressure in the carpal tunnel in comparison to a straight alignment of the hands. The carpal tunnel can be visualized as a straw; when a straw is bent it flattens out and compresses. This increase in carpal tunnel compression may damage the median nerve at this site. Furthermore, the lubrication lining around the tendons may become thick, sticky and swollen due to the wear and tear of repetitive hand movements, thus pressing the nerve against the tunnel. Blood vessels, as well, can be damaged. For some reason, many of the symptoms of repetitive stress injury appear at night or early in the morning and so frequently are not assumed to be related to repetitive motions during the day. A mild case of carpal tunnel syndrome costs $5,000 to $10,000 in medical care and lost work time, according to a study by the American Physical Therapy Association. If not caught in time, surgery often becomes necessary; costs, including surgery to both hands, may rise to $100,000.

From the above it is seen that a device and technique for reducing some of the risk of damage due to frequent computer/keyboard use is desired.

SUMMARY OF THE INVENTION

The present invention provides a wrist support pad, or wrist rest, of specially designed height for reducing strain on the wrists and hands of a keyboard operator or a similar user of computer accessories. The pad is made to be placed in front of the keyboard or accessory being used, and may be designed to have a particular firmness for comfort. In some embodiments the bottom surface has no "skin", to prevent the pad from slipping, while the upper surface has a smooth covering so hands may slide around easily and comfortably. In order to allow pads designed for a normal keyboard to be adapted for use with an especially long keyboard, or with an accessory like a mousepad, one embodiment of the invention has contours which can interlock with similar contours on an extension pad; these contours are also designed to be easily and inexpensively manufactured. A particular embodiment is formed as a wrist rest comprising a support layer having a first compression deflection pressure, a low friction surface layer bonded to the support layer, and a base layer bonded to the support layer and having a second compression deflection pressure, wherein the first deflection compression pressure is lower than the second compression deflection pressure.

In an exemplary embodiment, a wrist rest is provided having a length, a depth, and a height. The wrist rest includes a substantially rectangular support layer constructed of either an open or closed cell foam rubber. The support layer further includes a top surface and a planar bottom surface where the bottom surface is for contacting a work surface. Bonded to the top surface of the support layer is a substantially rectangular low friction surface layer having a planar top surface which is substantially parallel with the support layer when attached.

In another aspect of this embodiment, an anchor plate is provided for attachment to the wrist rest. The anchor plate may be placed under a keyboard so as to hold the wrist rest in place in front of the keyboard.

In a further aspect, the foam rubber is selected from the group consisting of neoprene rubber, butyl rubber, and styrene-butadiene rubber (SBR).

In another exemplary embodiment, a wrist rest is provided having a substantially rectangular support layer which includes a top low friction planar surface and a bottom planar surface. The top and bottom planar surfaces are substantially parallel.

The invention further provides a mouse wrist rest which includes a conventional mouse pad attached to a wrist rest. The wrist rest is constructed as previously described and allows a user's wrist to rest on the wrist rest while positioning a conventional computer mouse on the mouse pad. In one aspect, the mouse wrist rest includes an interlocking contour for attaching the mouse wrist rest to a keyboard wrist pad.

The invention further provides a platform wrist rest which includes a keyboard anchor plate (or platform) attached to a wrist rest. This embodiment allows a keyboard to be placed on the anchor plate while the wrist rest is securely positioned in front of the keyboard. This embodiment allows the wrist rest to be maintained at a desired position in front of the keyboard.

A further understanding of the nature and advantages of the invention may be realized by reference to the remaining portions of the specification and the drawings.

BRIEF DESCRIPTION OF THE DRAWINGS

FIG. 1 is a perspective view of a particular embodiment of the present invention;

FIG. 2A is a perspective view of a particular embodiment of an extension pad contoured according to an aspect of the present invention;

FIG. 2B is a diagram illustrating some of the contours of the extension pad of FIG. 2A;

FIG. 3 is a top view of a particular embodiment of a wrist rest joined to the extension pad of FIG. 2, according to an aspect of the present invention;

FIG. 4 is a top view of particular embodiments of a wrist rest and a mousepad contoured according to an aspect of the present invention and joined together;

DETAILED DESCRIPTION OF THE INVENTION

Figure 5A:
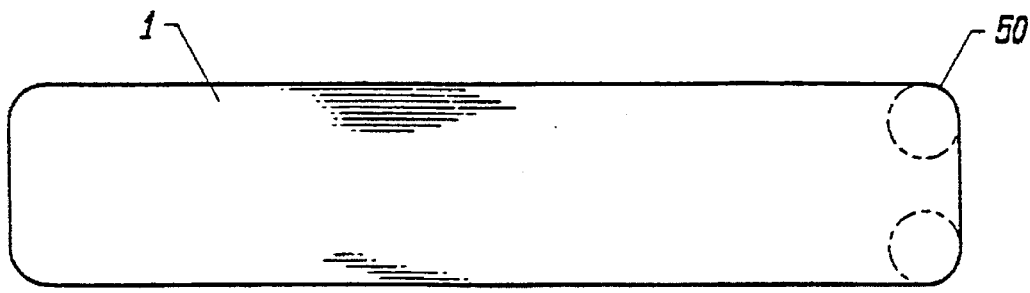
FIGS. 5A and 5B show a design diagram of a wrist rest and a top view of the resultant wrist rest, respectively.

One known option to alleviate the hand and arm stress associated with keyboard activity is the use of an arm or wrist rest. Proper height of a rest as well as its comfort of use are critical to its success in preventing or alleviating keyboard repetitive stress injuries. Prior art keyboard rests tended to be uncomfortable and to have inappropriate thicknesses or support heights. The wrist rest of the present invention is designed to meet these requirements.

A particular embodiment of a wrist rest according to the present invention is shown in FIG. 1, and denoted generally by reference numeral 1. The pad is meant to lie lengthwise in front of a keyboard; it should be long enough to provide support along the entire length, including any numeric keypad, of the keyboard with which it is used. A length of about 19.5 inches is suitable for the vast majority of keyboards currently in use. Together with length, depth frames the surface of the pad. Unless tailored for a specific individual, the pad's depth should provide comfortable support for both large and small hands; about 4 inches is suitable for general use.

A critical dimension of the pad is the thickness. The thickness should be chosen so that while typing, users can comfortably rest their wrists or the heels of their hands on the pad and keep the wrist joints supported at a healthy angle so as to minimize damaging stress caused and exacerbated by compression of nerves and tendons in the carpal tunnel. The least amount of strain is put on the wrist joints when the hand extends level from the forearm, and within a range of about five to ten degrees in either direction; the smaller the angle, the less the strain. The wrist angle should be maintained within this range, particularly within 5 degrees, as much as possible throughout the entire extent of hand movements at the keyboard. The proper thickness for the wrist rest is thus directly tied to the height of the keyboard or other device with which the pad is to be used. The basic rule is that the rest should be about equal in height to the front of the keyboard. A particular embodiment of the present invention is designed to maintain the proper wrist angle with the majority of computer keyboards in commercial use, in which case thicknesses from about ½ inch to 1 inch can be used, with a thickness of about ⅝ inch to ⅞ inch being better, and ¾ inch most preferred. The physical dimensions of the wrist pad are not the only significant characteristics of the pad, however.

The wrist rest must not only provide support at the proper height, but must also be comfortable enough that users actually do rest their wrists on the pad during substantially all keyboard use. The wrist rest 1 of FIG. 1 has three layers. A low friction surface layer 10 is provided to allow the hand easy travel along the length of the keyboard. By "low friction" it is meant that the skin to surface friction is low enough that the hand can slide relatively freely, without inclining users to lift their hands when moving them. Surface layer 10 can also help prevent heat buildup and sweating, and may be soft to the touch. Materials such as nylon, polyester, and Lycra™ (DuPont) are examples of materials suitable for the surface layer; these may be used in a woven cloth form and are of negligible thickness.

Underneath surface layer 10 and bonded to it is a support layer 20. This layer needs to be firm enough to provide proper support for the hands, yet be supple enough to be comfortable. Foam rubber (or sponge rubber or rubber sponge) is a good material for the support layer; neoprene (wet-suit material) being particularly suitable. The compression-deflection pressure of support layer 20 should be at least about 2 psi, and no more than 13 psi. A compression-deflection pressure under 9 psi is preferable, with the most preferable range being about 2–5 psi.

Underneath the support layer may optionally be bonded a base layer, such as layer 30 of FIG. 1. This base layer 30 is preferably firmer than support layer 20, and helps stabilize the pad. A suitable compression-deflection pressure for base layer 30 is greater than about 5 psi, with a preferred range of about 5–9 psi. Hard materials such as wood or plastic may be used, but foam rubbers, and neoprene in particular, work quite well also for the base layer. If neoprene or some other foam rubber which may come with a "skin" (a surface layer formed during the curing process) is used for the bottom layer of the pad, the bottom surface should be "split", or "open", skin (basically, skinless), and can optionally be scored, to give the pad better contact with the desktop or other work surface, so the pad slides around less. If a harder material is used for the base layer, some other contact material beneath it may be necessary to reduce sliding.

FIG. 2A shows an extension pad 2, with only two layers—a surface layer 10 and a support layer 20. The support layer is made as thick as the combined support and base layers of the example of FIG. 1. Surface layer 10 could conceivably be left out as well, provided that the surface of the support layer was smooth and slick enough to allow a user's hand to slide freely across it. An interlocking contour 100 is provided so that the extension pad may be joined with a wrist rest, such as in FIG. 3, which shows extension pad 2 joined to a wrist rest 3. In this embodiment, the radius of curvature of the corners is ¾ inches; the radius of curvature of the arcs used to define interlocking contour 100 is also ¾ inches. FIG. 2B illustrates in more detail interlocking contour 100. Contour 100 is a composite of three arc segments from circles 1000, 2000, and 3000. The radius of curvature of each of these circles is about ¾ inches. Circle 1000 joins the side of pad 2 at a point indicated by segment A—A, therefore having its center ¾" left of that point of joinder. Circle 2000 has its center about 13/16 inches left of and about 1 13/16 inches above the center of circle 1000. Circle 3000 has its center about 2⅜ inches directly above the center of circle 1000. These distances are approximate; the circles should meet tangentially at the points indicated by segments B—B and C—C. An arc segment 1100 extends around the lesser portion of circle 1000 from A—A to B—B, where it joins an arc segment 2100. Arc segment 2100 extends around the greater portion of circle 2000 from B—B to C—C, where it joins an arc segment 3100, which extends around the lesser portion of circle 3000 from C—C to D—D. Arc Segments 1100, 2100 and 3100 together form interlocking contour 100.

An extension pad will be particularly useful if the keyboard is exceptionally wide, or if an auxiliary device such as a track ball is positioned next to the keyboard; a typical width for such an extension pad is around six inches. The interlocking contours help keep the extension pad in place, and interlocking contours can also be used to join a wrist rest to a mousepad, as in FIG. 4, which shows wrist rest 3 joined to mousepad 4. Such interlocking keeps the mousepad secure and provides continuous support for the wrist. One advantage of such interlocking pads over a wrist rest formed integrally with a mousepad is that with the interlock feature the same wrist rest may be used with either a right-handed or left-handed mousepad simply by being rotated 180° with the surface remaining face up.

Figure 5B:
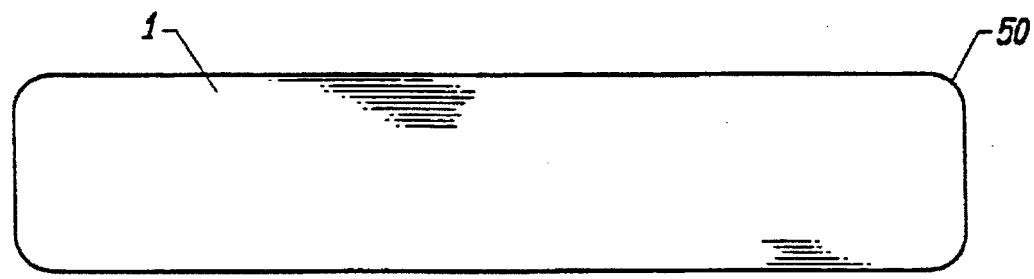
Figure 6A:
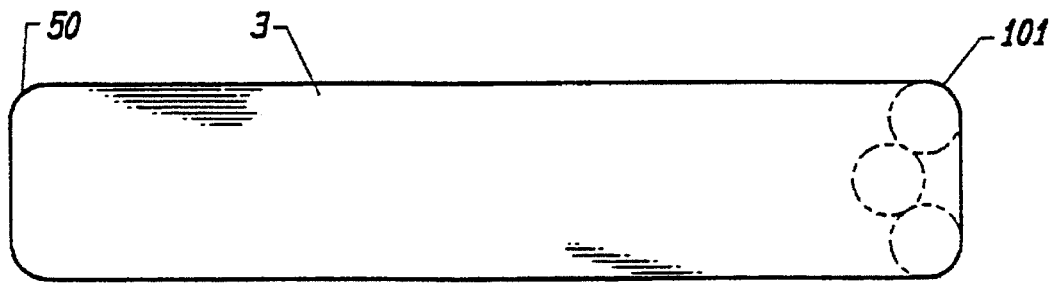
FIGS. 6A and 6B show a design diagram of a wrist rest with interlocking contours and a top view of the resultant wrist rest, respectively.
Figure 6B:
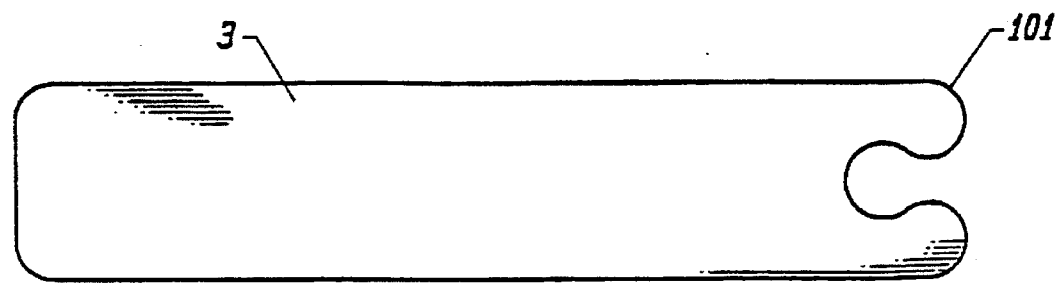
Figure 7A:
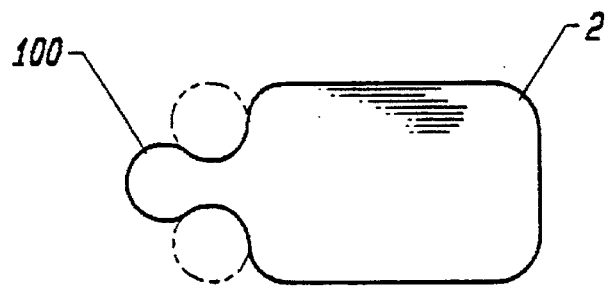
FIGS. 7A and 7B show a design diagram of an extension pad with interlocking contours and a top view of the resultant extension pad, respectively.
Figure 7B:
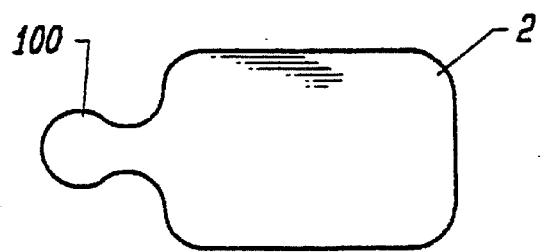
Figure 8A:
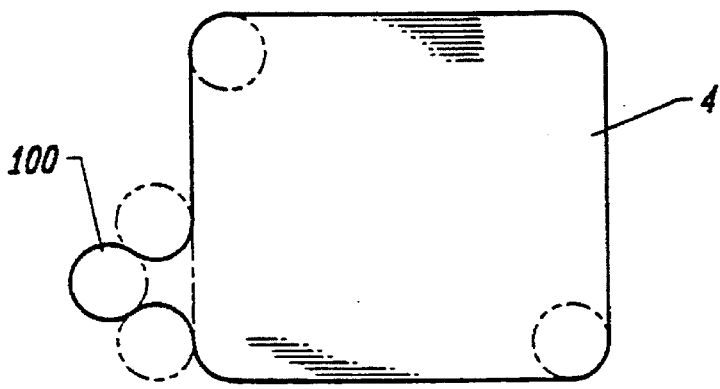
FIGS. 8A and 8B show a design diagram of a mousepad with interlocking contours and a top view of the resultant mousepad, respectively.
Figure 8B:
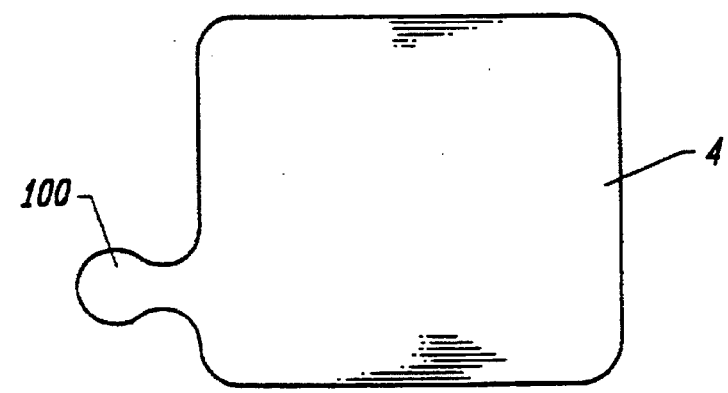

FIGS. 5A and 5B show a design diagram of an wrist rest 1 with rounded corners 50, and a top view of the resultant wrist rest, respectively. The radius of curvature of the corners is ¾ inches. FIGS. 6A and 6B show a design diagram of an wrist rest with an interlocking contour and a top view of the resultant wrist rest, respectively. Again, the radius of curvature of the corners is ¾ inches; the radius of curvature of arcs used to define an interlocking contour 101 is also ¾ inches. It is formed in the same general manner as contour 100, described above, but it extends into the pad as a hole rather than out from it as a projection. FIGS. 7A, 7B and 8A, 8B show similar diagrams for an extension pad and a mousepad, respectively. Having the accessory pads interlock with the wrist rest assures a close fit and an even surface so the user's hand may slide freely across from one to another. The formation of the interlocking contours has high aesthetic appeal as well as having manufacturing benefits such as about 15 percent less wasted material and more compact shipping. The curves may be cut into neoprene by using a swing arm clicker press, a travelling head press, or a full head press, with steel rule dies.

Figure 9:
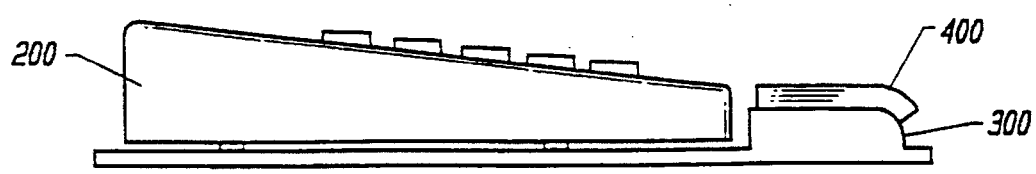
FIG. 9 shows a side view of a prior art wrist rest with a particular embodiment of a novel support pad attached on top, in front of a keyboard.
Figure 10:
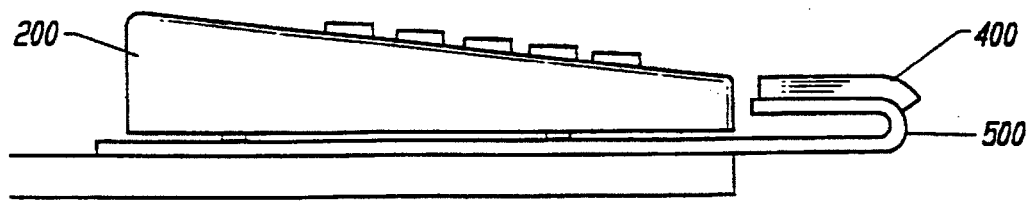
FIG. 10 shows a side view of a wrist rest with a particular embodiment of a novel support pad attached on top, in front of a keyboard.

FIG. 9 shows a keyboard 200 with a prior art wrist rest 300, many of which are about ½ inch high. In order to compensate for this low height, a support pad 400 is glued onto the wrist rest 300; this may be done with an adhesive layer on the bottom of the support pad. Support pad 400 may extend around the front of wrist rest 300 as shown here, or it may cover only the top surface. It is manufactured in the same manner as the previously described wrist rest of the present invention, but it is generally made without a base layer and has a total height of about ¼ inch. This ¼ inch height plus the ½ inch height of the prior wrist rest combine to make a support surface ¾ inch high, ideal for most keyboards. FIG. 10 shows a keyboard and a support pad 400 attached to another wrist rest 500, which has a recurve portion in front.

Figure 11:
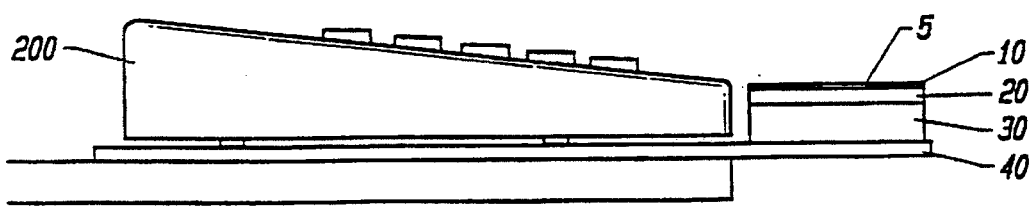
FIG. 11 shows a side view of a particular embodiment of a wrist rest with an anchor plate according to an aspect of the present invention, in front of a keyboard.

FIG. 11 shows a keyboard 200, and in front and underneath it a wrist rest 5. Wrist rest 5 has a surface layer 10, a support layer 20, a base layer 30, and an anchor plate 40. Anchor plate 40 slides under the keyboard and allows the wrist rest to be positioned in front of a keyboard with no support directly underneath the wrist rest.

Figure 12:
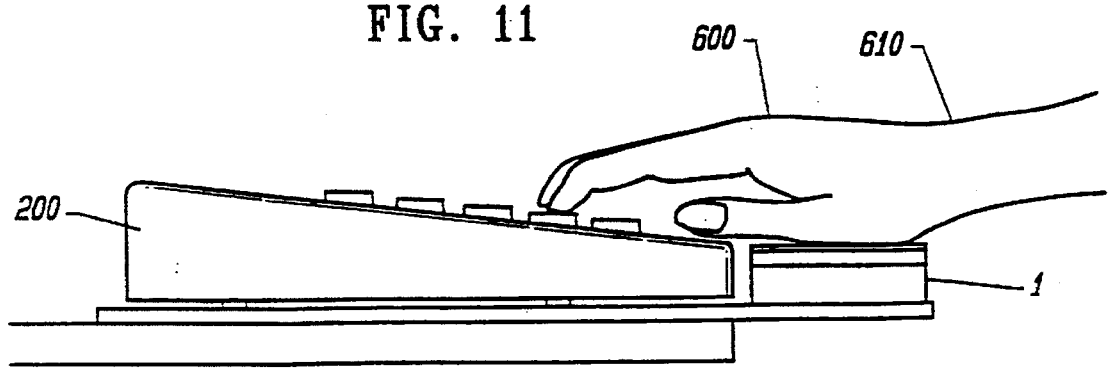
FIG. 12 shows a side view of a particular embodiment of a wrist rest according to an aspect of the present invention, with a user's hand resting on the wrist rest and keyboard.

FIG. 12 shows a wrist rest 1 in front of a keyboard 200. Also shown is a user's hand 600 in normal position on the wrist rest and keyboard. The user's wrist 610 is supported nearly level, with almost no deflection angle.

Some difficulties may arise in the manufacture of foam rubber pads such as these. Typical problems include lingering odor after manufacture, and warpage resulting from different layers being bonded together. Neoprene fortunately has basically no odor, a distinct advantage over most other foam rubbers, which retain a strong odor. Even with neoprene, an odor may be caused by the glue employed to bond layers, in which case aging the wrist rest in the sun may help reduce this glue odor. One way of reducing or solving the warpage problem is to heat age the materials before manufacture so there will be no differential shrinking of different layers during manufacture. An alternative method is simply to employ materials with the same heat shrinkage characteristics.

Figure 13:
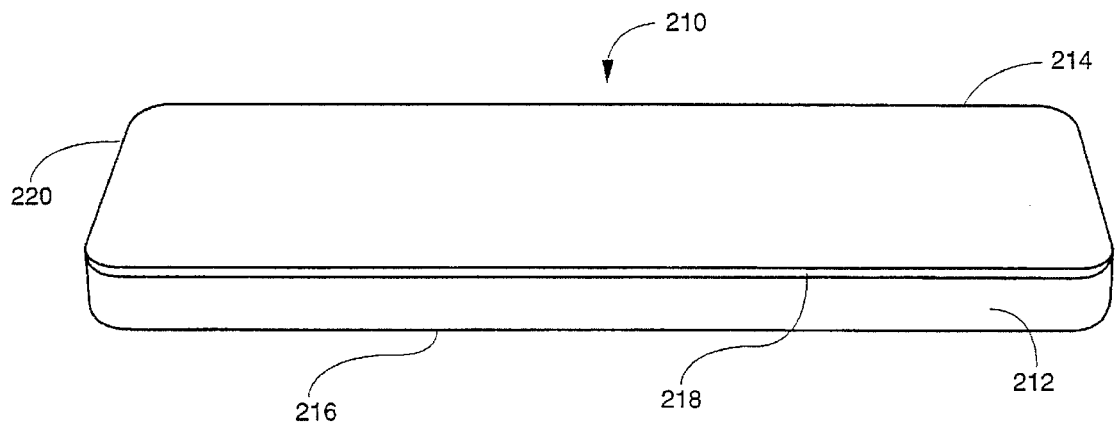
FIG. 13 is a perspective view of a wrist rest having a support layer and a low friction surface layer according to the present invention.

As previously described in connection with FIG. 1, wrist rests according to the present invention can be constructed using only a support layer and a low friction surface layer. A wrist rest 210 having only a support layer 212 and a low friction surface layer 214 is shown in FIG. 13. As previously described, the support layer 212 can be constructed of foam rubber. Generally, rubber can be classified as natural or synthetic, and can alternately be classified as being cellular, i.e. foamed, or non-cellular. If in cellular form, rubber can be further classified as open-celled or closed-celled. Open-celled generally means that the cells are interconnected in such a manner that gas can penetrate from one cell to another, such as sponge rubber. For closed-celled rubbers, the cells are discrete and independent of the other cells, such as in neoprene rubber.

The support layer 212, as well as the support layers used in all the embodiments of the present invention, can be constructed of any type of rubber, and is preferably made from rubber in cellular form, either open-celled or closed celled. Preferable rubbers include neoprene (or polycholoroprene), styrene-butadiene rubbers (SBR), butyl rubber, and the like.

The support layer 212 has a planar bottom surface 216 for contacting a work surface. The low friction surface layer 214 is bonded to a top surface 218 of the support layer 212 and has a planar top surface 220. The support layer 212 and low friction surface layer 214 are joined so that the planar bottom surface 216 of the support layer 212 and the top planar surface 220 of the low friction surface layer 214 are substantially parallel. The height of the wrist rest 210 is preferably the same height as the wrist rest 1 in FIG. 1. In another embodiment, the low friction surface layer 214 can be omitted and the top surface 218 of the support layer 212 can made planar and substantially parallel with the planar bottom surface 216.

Figure 14:
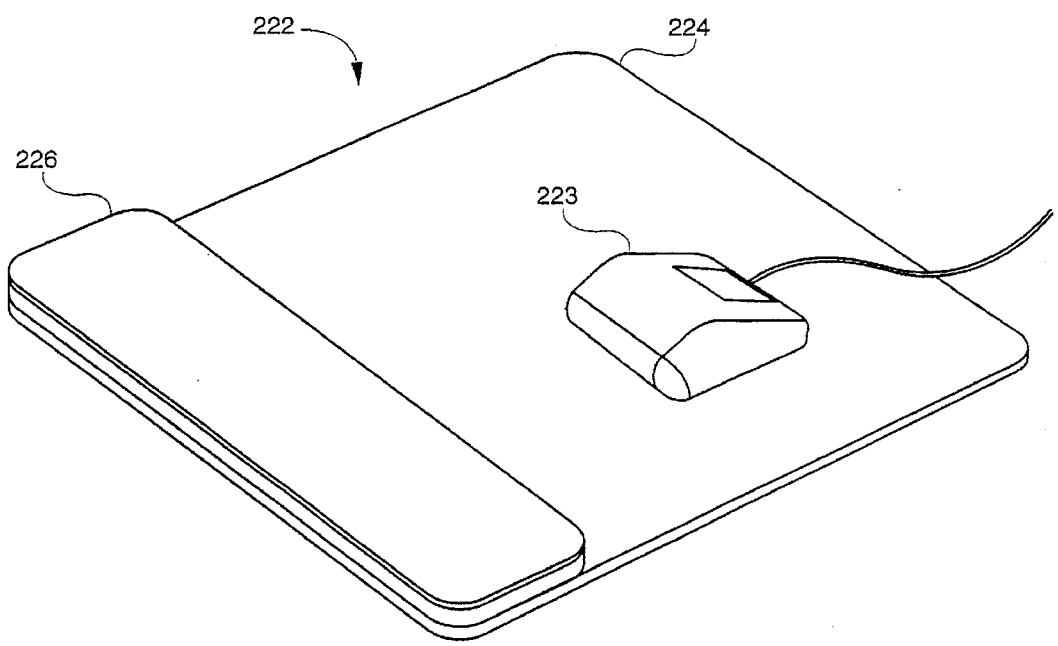
FIG. 14 is a perspective view of a mouse wrist rest according to the present invention.

A mouse wrist rest 222 is shown in FIG. 14 along with a conventional computer mouse 223. The mouse wrist rest 222 includes a mouse pad 224 and a wrist rest 226. The mouse pad 224 can be a commercially available conventional mouse pad, available from commercial suppliers such as Fry's Electronics, Palo Alto, Calif. and Wal-Mart. Alternatively, the mouse pad 224 can be constructed of closed cell rubber, polycarbonate plastic such as LEXAN® (General Electric Plastics), other plastics and the like.

The wrist rest 226 can be constructed essentially identical to the wrist rests 1 or 210 as previously described herein, and sized appropriately in width to match the width of the mouse pad 224. The wrist rest 226 is securely attached to the mouse pad 224, preferably by bonding. The bond should be strong enough to maintain attachment of the wrist rest 226 and mouse pad 224 during normal use.

Figure 15:
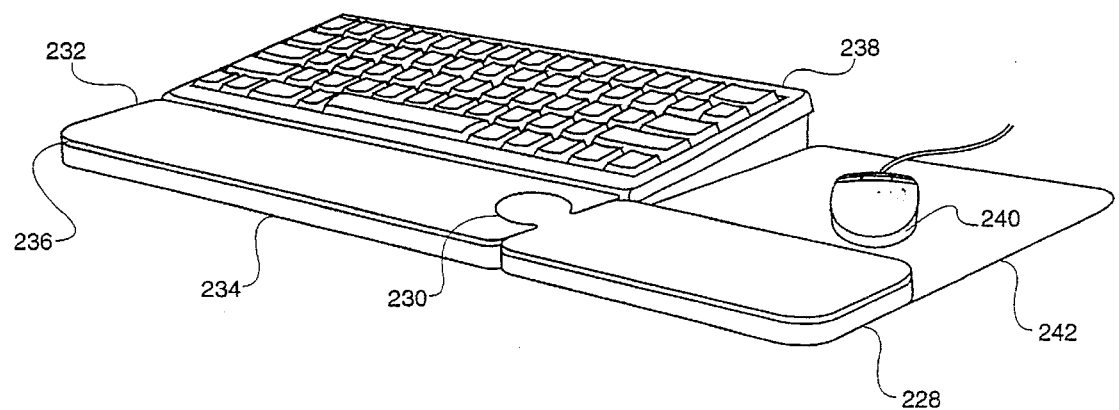
FIG. 15 is a perspective view of a puzzle mouse wrist rest interlocking with a platform wrist rest according to the present invention.

A puzzle mouse wrist rest 228 is shown in FIG. 15. The puzzle mouse wrist rest 228 is essentially identical to the wrist rest 226 as described in connection with FIG. 14 except that the puzzle mouse wrist rest 228 has an interlocking connection 230. The interlocking connection 230 is used to interlock the puzzle mouse wrist rest 228 to a keyboard wrist rest 232.

The keyboard wrist rest 232 can be essentially identical to the wrist rest shown in FIG. 11, or can be the wrist rest 210 of FIG. 13 attached to a keyboard anchor plate, or can be a single wrist rest essentially identical to wrist rests 1 or 210 as previously described. As shown in FIG. 15, the keyboard wrist rest 232 is a "platform" style wrist rest as described in connection with FIG. 11. The keyboard wrist rest 232 has a support layer 234 and a low friction surface layer 236, and is constructed essentially identical to the wrist rest 210 described in FIG. 13. Attached to the support layer 234 is an anchor plate (not shown) for placement under a keyboard 238. The anchor plate serves to anchor the support layer 234 is proper alignment with the keyboard 238. The anchor is constructed of a rigid material, and is preferably made of metal, aluminum, plastic, rubber, composites, and the like. Optionally, the anchor can be coated with a protective material to prevent the anchor from scratching a desk or other office equipment. Preferably, the anchor will be coated with neoprene rubber.

The interlocking connection 230 can be a male connection as shown in FIG. 15, or can alternatively be a female connection which interlocks with a corresponding male interlocking connector on the keyboard wrist rest 232. The interlocking connection 230 is preferably formed as previously described in connection with FIGS. 2A and 2B.

By securing the puzzle mouse wrist rest 228 with the keyboard wrist rest 232, a mouse 240 can be positioned on a mousepad 242 by a user while the puzzle mouse wrist rest 228 is prevented from sliding by the keyboard wrist rest 232. By attaching the puzzle mouse wrist rest 228 to the keyboard wrist rest 232, the user is further able to rest his or her wrist while typing at the keyboard 238 or while positioning the mouse 240.

Figure 16:
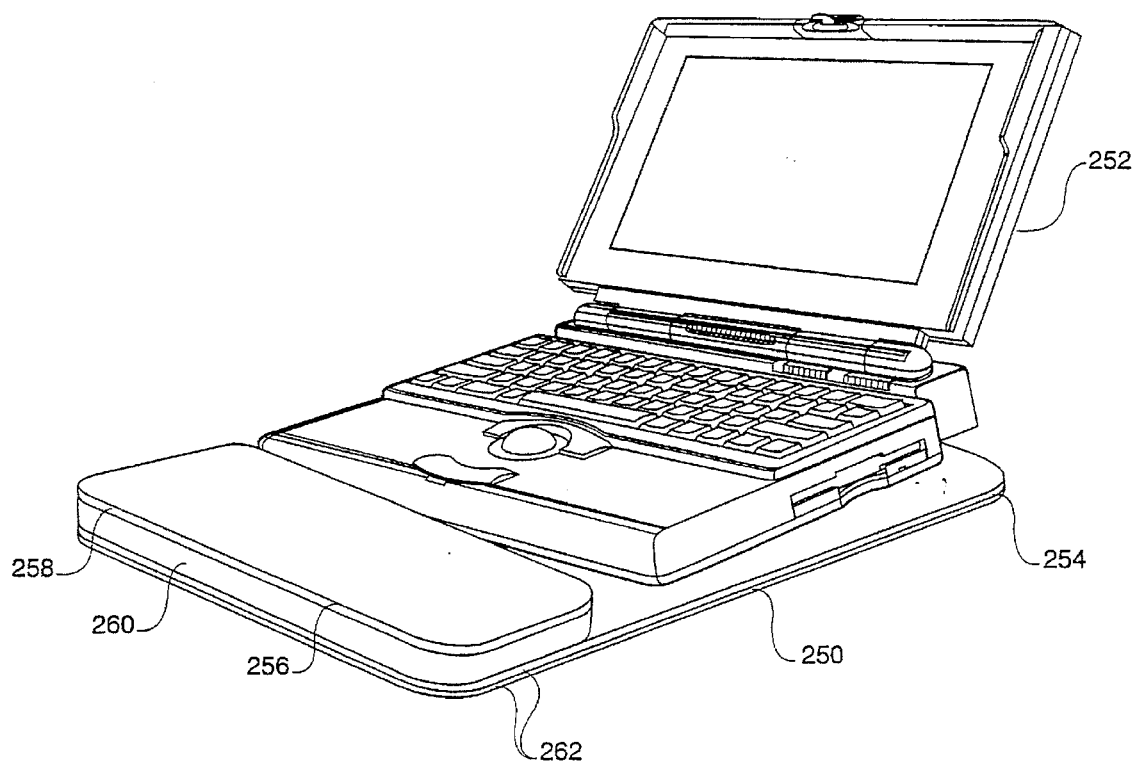
FIG. 16 Is a perspective view of a notebook wrist rest according to the present invention.

A notebook wrist rest 250 is shown in FIG. 16. The notebook wrist rest 250 is preferably used with a notebook computer 252. The notebook wrist rest 250 includes an anchor plate 254 and a wrist rest 256. The notebook wrist rest 250 can be configured to be essential identical to the wrist rest described in connection with FIG. 11, except for being sized to the dimensions of the notebook computer 252. When configured like the wrist rest of FIG. 11, the wrist rest 256 includes a low friction layer 258, a support layer 260, and a base layer (not shown) below the support layer 260. Alternatively, the wrist rest can be constructed using only the support layer 260 and the low friction layer 258 as previously described.

The anchor plate 254 can be constructed essentially identical to the anchor plate described in connection with FIG. 11. In another aspect, the anchor plate 254 will preferably be sandwiched between layers of neoprene rubber 262 which serve to prevent the anchor plate 254 from scratching a desktop or other work surface.

It is to be understood that the above description is intended to be illustrative and not restrictive. Many embodiments will be apparent to those of skill in the art upon reviewing the above description. For instance, the interlocking contours could be formed in a dovetail shape. The scope of the invention should, therefore, be determined with reference to the appended claims, along with the full scope of equivalents to which such claims are entitled.

What is claimed is:

1. A wrist rest having a length, a depth, and a height, comprising:

a substantially rectangular base layer having a planar bottom surface and a top surface;

a substantially rectangular low friction surface layer comprising a bottom surface and planar top surface;

a substantially rectangular support layer between said base layer and said low friction surface layer, said support layer having a top surface and a bottom surface, wherein said top surface of said support layer is attached to said bottom surface of said low friction layer and said bottom surface of said support layer is attached to said top surface of said base layer, and wherein said planar top surface of said low friction surface layer is substantially parallel with said planar bottom surface of said support layer; and wherein the thickness of the wrist rest is in the range from about ½ to 1 inches.

2. The wrist rest of claim 1, wherein said support layer is an open or a closed cell foam rubber.

3. The wrist rest of claim 1, wherein said surface layer is constructed of material selected from the group consisting of nylon and polyester.

4. The wrist rest of claim 1, wherein the thickness is about ¾ inches.

5. The wrist rest of claim 1, further comprising an anchor plate which may be placed under a keyboard so as to hold the wrist rest in place in front of the keyboard.

6. The wrist rest of claim 1 wherein said base layer is an open or a closed cell foam rubber.

7. The wrist rest of claim 6, wherein said foam rubber is selected from the group consisting of neoprene rubber, butyl rubber, and styrene-butadiene rubber (SBR).

8. The wrist rest of claim 1, wherein the corners of the wrist rest are rounded and have a radius of curvature of about ¾ inches.

9. A mouse wrist rest, comprising:

a mouse pad having top and bottom planar surfaces;

a wrist rest having a length, a depth, and a height, the wrist rest comprising:
  a substantially rectangular support layer comprising an open or closed cell foam rubber, said support layer further comprising a top surface and a planar bottom surface, said bottom surface attached to said top surface of said mouse pad;
  a substantially rectangular low friction surface layer bonded to said support layer, said low friction layer comprising a bottom surface and planar top surface, wherein said top surface of said support layer is bonded to said bottom surface of said low friction layer, and wherein said planar top surface of said low friction surface layer is substantially parallel with said planar bottom surface of said support layer; and wherein the thickness of the wrist rest is in the range from about ½ to 1 inches.

10. The wrist rest of claim 9, wherein the thickness is about ¾ inches.

11. The mouse wrist rest of claim 9, wherein the wrist rest further comprises an interlocking contour by means of which said wrist rest is attachable to a keyboard wrist rest.

12. The mouse wrist rest of claim 11, wherein said interlocking contour is shaped by three arc segments from circles of the same radius.

13. The mouse wrist rest of claim 9, further comprising a base layer bonded between said support layer and said mouse pad, said base layer having a first compression deflection pressure, wherein said support layer has a second compression deflection pressure, said first deflection pressure being higher than said second compression deflection pressure.

14. A wrist rest in combination with an extension pad, the combination comprising:

an interlocking contour on said wrist rest and a corresponding interlocking contour on said extension pad, said contours for coupling said wrist rest and said extension pad together.

15. The wrist rest of claim 14, wherein said interlocking contours are shaped by three arc segments from circles of the same radius.

16. A platform wrist rest, comprising:

an anchor plate having top and bottom planar surfaces;

a wrist rest having a length, a depth, and a height, the wrist rest comprising:
  a substantially rectangular support layer comprising an open or closed cell foam rubber, said support layer further comprising a top surface and a planar bottom surface, said bottom surface attached to said top planar surface of said anchor plate;
  a substantially rectangular low friction surface layer bonded to said support layer, said low friction layer comprising a bottom surface and planar top surface, wherein said top surface of said support layer is attached to said bottom surface of said low friction layer, and wherein said planar top surface of said low friction surface layer is substantially parallel with said planar bottom surface of said support layer; and
  wherein the thickness of the wrist rest is in the range from about ½ to 1 inches.

17. The platform wrist rest of claim 16, further comprising a base layer bonded between said support layer and said anchor plate, said base layer having a first compression deflection pressure, wherein said support layer has a second compression deflection pressure, said first deflection pressure being higher than said second compression deflection pressure.

18. A mouse wrist rest, comprising:

a mouse pad having top and bottom planar surfaces;

a wrist rest having a length, a depth, and a height, the wrist rest comprising:
  a substantially rectangular support layer comprising a top low friction planar surface and a bottom planar surface, wherein said top planar surface and said bottom planar surface are substantially parallel;

wherein the thickness of the wrist rest is in the range from about ½ to 1 inches; and wherein said wrist rest is attached to said top planar surface of said mouse pad.

19. The mouse wrist rest of claim 18, wherein the wrist rest further comprises an interlocking contour by means of which said wrist rest is attachable to a keyboard wrist rest.

20. The mouse wrist rest of claim 19, wherein said interlocking contour is shaped by three arc segments from circles of the same radius.

* * * * *